United States Patent [19]
Bennett et al.

[11] Patent Number: 5,666,359
[45] Date of Patent: Sep. 9, 1997

[54] METHOD AND APPARATUS FOR DISPLAYING PORT INFORMATION

[75] Inventors: Arthur T. Bennett; K. Arlan Harris, both of Coppell, Tex.

[73] Assignee: Compaq Computer Corp., Houston, Tex.

[21] Appl. No.: 560,531

[22] Filed: Nov. 17, 1995

Related U.S. Application Data

[63] Continuation-in-part of Ser. No. 501,288, Jul. 12, 1995.

[51] Int. Cl.$^6$ ........................................... H04J 3/22
[52] U.S. Cl. ........................................... 370/358
[58] Field of Search ............................ 370/84, 94.1, 60, 370/60.1, 97, 13.1, 85.13, 401, 402, 405–408, 425, 424, 501, 502, 492, 911, 908, 907, 905, 901, 902, 543, 544, 545, 538, 912, 358, 466, 467; 455/11.1, 7, 13.1; 375/211; 371/20.2

[56] References Cited

U.S. PATENT DOCUMENTS

| | | | |
|---|---|---|---|
| Re. 33,426 | 11/1990 | Sugimoto et al. | 370/85.14 |
| 3,739,098 | 6/1973 | Camiciottoli et al. | 370/97 |
| 4,500,990 | 2/1985 | Akashi | 370/85.13 |
| 4,597,078 | 6/1986 | Kempf | 370/94.1 |
| 4,627,052 | 12/1986 | Hoare et al. | 370/85.13 |
| 4,737,953 | 4/1988 | Koch et al. | 370/94.1 |
| 4,825,435 | 4/1989 | Amundsen et al. | 370/97 |

(List continued on next page.)

FOREIGN PATENT DOCUMENTS 3-124138  5/1991  Japan .

OTHER PUBLICATIONS

"Penril Series 2000 Overview" Brochure, *Penril Datacomm Networks*, May, 1992, 4 pages.
"Penril Series 2500 Overview" Brochure, *Penril Datacomm Networks*, May, 1992, 4 pages.
"Penril Module 2530 10BaseT Concentration+ Bridging" Brochure, *Penril Datacomm Networks*, May, 1992, 2 pages.
"MultiGate Product Guide 1992" Draft, *Network Resources Corporation*, 1992, pp. 1–18.

(List continued on next page.)

*Primary Examiner*—Dang Ton
*Attorney, Agent, or Firm*—Jenkens & Gilchrist

[57] ABSTRACT

A network (10) includes a repeater (12) that can service data devices that operate using different communications protocols. The data devices (18, 20, 22) couple to the ports (34) of the repeater (12), and operate using a first communications protocol in a first domain (14). The data devices (26, 28, 30) also couple to the ports (34) of the repeater (12) and operate using a second communications protocol in a second domain (16). Information on the operation of a port (34) may be displayed using one port indicator (202) or two port indicators (300, 302).

25 Claims, 7 Drawing Sheets

U.S. PATENT DOCUMENTS

| | | | |
|---|---|---|---|
| 4,901,312 | 2/1990 | Hui et al. | 370/85.12 |
| 4,922,503 | 5/1990 | Leone | 370/85.13 |
| 4,982,400 | 1/1991 | Ebersole | 370/85.15 |
| 5,060,228 | 10/1991 | Tsutsui et al. | 370/85.13 |
| 5,088,032 | 2/1992 | Bosack | 395/200 |
| 5,111,453 | 5/1992 | Morrow | 370/85.13 |
| 5,179,554 | 1/1993 | Lomicka et al. | 370/85.13 |
| 5,214,646 | 5/1993 | Yacoby | 370/85.14 |
| 5,251,213 | 10/1993 | Videlock et al. | 370/85.12 |
| 5,283,781 | 2/1994 | Buda et al. | 375/212 |
| 5,299,195 | 3/1994 | Shah | 370/85.6 |
| 5,301,303 | 4/1994 | Abraham et al. | 395/500 |
| 5,319,363 | 6/1994 | Welch et al. | 340/825.17 |
| 5,329,618 | 7/1994 | Moati et al. | 395/200 |
| 5,343,471 | 8/1994 | Cassagnol | 370/85.13 |
| 5,379,289 | 1/1995 | DeSouza et al. | 370/85.13 |
| 5,434,863 | 7/1995 | Onishi et al. | 370/85.13 |
| 5,436,617 | 7/1995 | Adams et al. | 370/85.13 |
| 5,490,252 | 2/1996 | Macela et al. | 370/85.13 |
| 5,491,687 | 2/1996 | Christensen et al. | 370/85.13 |

OTHER PUBLICATIONS

"Retix® 4760 High–Performance Local Bridge/Router" Brochure, *Retix®*, 1992, 4 pages.

"Retix® 4660 High Performance Local Bridge" Brochure, *Retix®*, 1993, 4 pages.

"HUB 2 Input/Output Bus Block Diagram," *Picazo*, Jan. 26, 1993, 1 page.

"Product Specifications—AsantéHub 1012" Brochure, *Asanté Technologies, Inc.*, May, 1993, 6 pages.

"AsantéHub 2072" Brochure, *Asanté Technologies, Inc.*, May, 1993, 8 pages.

"AsantéView" Brochure, *Asanté Technologies, Inc.*, May, 1993, 4 pages.

"DAVID ExpressNet® Workgroup Hubs" Brochure, *DAVID Systems Incorporated*, May, 1993, 2 pages.

William B. Urinoski, "NetMetrix," *The X Journal*, May–Jun., 1993, 2 pages.

"HP NetMetrix" Advertisement, *Hewlett® Packard*, Source Unknown, Date Unknown, 2 pages.

"HP Probe View/SNMP for Open View and LanProbe II Segment Monitors" Brochure, *Hewlett® Packard*, 1993, pp. 1–8.

"Networking Products" Brochure, *DAVID Systems Incorporated*, Jul., 1993, 4 pages.

"Channel One Open Networking Enterprise Newsletter," *Retix®*, Fall, 1993, pp. 1–12.

"MultiGate® Hub 2" Brochure, *Network Resoures Corporation*, Dec., 1993, 2 pages.

"MultiGate® Hub 1w" Brochure, *Network Resoures Corporation*, Dec., 1993, 2 pages.

"NRC Fault Tolerant LAN Architecture" Brochure, *Network Resources Corporation*, Date Unknown, 4 pages.

"MultiGate Hub 1+" Brochure, *Network Resources Corporation*, Date Unknown, 1 page.

"MultiGate Hub 2—WAN Version" *Network Resources Corporation*, Date Unknown, 1 page.

"The AsantéBridge 1012 Hardware Module Features" Brochure, *Asanté*, Date Unknown, 2 pages.

"IEEE 802.3/Ethernet Twisted Pair Products 10BASE–T Standard Compatible" Brochure, *Cabletron Systems Inc.*, Date Unknown, pp. 1–12.

"Cisco Router Module" Brochure, *Cabletron Systems Inc.*, Date Unknown, 4 pages.

"82300 MainStreet® Ethernet Little Bridge" Brochure, *Newbridge Networks Inc.*, Date Unknown, 2 pages.

Letter from James P. McNaul, President and CEO of Fastlan Solutions to John F. McHale, President and CEO of NetWorth, Inc. with attached "Fastbridge™ 1200 Two–Port 10/100 Mbps Ethernet Bridge" Brochure, Jan. 31, 1995, 4 pages.

"ANSI/IEEE Std 802.3 Draft Supplement—MAC Parameters, Medium Attachment Units, Repeater for 100 Mbps Operation (version 3.0)", *IEEE Standards Department*, 1994, 212 pages.

"NetWorth™ 100 Base–T Cabling and Configuration" Brochure, 1995, 4 pages.

"Building Bandwidth: A White Paper on Designing Segmented Ethernet Networks," *Networth™*, Date Unknown, pp. 1–12.

"PowerPipes Ethernet/FDDI Switching Hub Client/Server Switching—NetWorth Switching White Paper," *NetWorth™*, 1993, pp. 1–8.

"NetWorth's Network Management Strategy," *NetWorth™*, Date Unknown, pp. 1–15.

"Fast Ethernet Strategy—Revision 1.0" Brochure, *NetWorth™*, 1995, 4 pages.

"Micro 100™ Fast Ethernet Hub—Product Information Sheet Rev. 2.0" Brochure, *NetWorth™*, Date Unknown, 2 pages.

Gary Gunnerson, "Networking Switching Hubs—Switching to the Fast Track," *PC Magazine*, Oct. 11, 1994, 6 pages.

Scott Bradner, "Network for Client/Server Computing—The Bradner Bridge Report," *CMP Publication, Inc.*, Oct. 1994, 4 pages.

"NetWorth's Legacy of NetWare Optimization," *NetWorth™*, Date Unknown, pp. 1–14.

METHOD AND APPARATUS FOR DISPLAYING PORT INFORMATION

RELATED APPLICATIONS

This application is a continuation-in-part application of pending U.S. patent application Ser. No. 08/501,288, entitled "Adaptive Repeater System," filed Jul. 12, 1995 and assigned to NetWorth, Inc., of Dallas, Tex.

TECHNICAL FIELD OF THE INVENTION

This invention relates to the field of networking data devices, and more particularly to a method and apparatus for displaying port information.

BACKGROUND OF THE INVENTION

Ethernet is a common communications standard used in local area networks (LANs) to share information among computers, printers, modems, and other data devices. A traditional Ethernet network operates at transmission rates of ten megabits per second (Mbps), but there is currently a move in the networking industry towards higher capacity 100-Mbps networks. This transition towards higher transmission rates often results in hybrid systems that service both 10-Mbps and 100-Mbps data devices. As a result, many networks are servicing data devices that operate using different communications protocols.

A repeater in a network receives data from a data device and re-transmits the data to the remaining data devices attached to the repeater. For example, a 10-Mbps repeater with six ports may receive a data message on one of its ports and repeat or re-transmit the message to the remaining five ports. Without bridging devices, each data device coupled to the repeater normally operates at 10-Mbps. To service 100-Mbps data devices or other devices using a different communications protocol, the network could add an additional repeater.

As networks evolve with a mix of data devices operating with different communications protocols, repeater couplings and hardware must also be modified. In addition, effective management of these hybrid systems may be improved by accurately conveying repeater port information.

SUMMARY OF THE INVENTION

Therefore, a need has arisen for a repeater that can both service data devices that operate using different communications protocols and effectively display port information.

In one embodiment of the present invention, a repeater for exchanging data among a plurality of data devices includes a plurality of ports operable to couple to the data devices. Each port is operable to exchange data with an associated data device in a selected one of a first domain and a second domain. A port indicator is associated with each of the ports and is operable to display information on its associated port. A mode indicator has a first mode and a second mode. The first mode signifies that the port indicators display information on ports operating in the first domain. The second mode indicates that the port indicators display information on ports operating in the second domain.

Technical advantages of the present invention include providing a repeater that services data devices that operate using different communications protocols. Each protocol, whether distinguished by data rate, physical link, or otherwise, is associated with two or more repeater domains serviced by the repeater. Port information for each repeater domain is provided by port indicators associated with each port. In a particular embodiment, a single port indicator for each port provides information on the port operating in its associated repeater domain, depending on the selected mode of display. In another particular embodiment, each port has two or more port indicators for displaying port information in two or more repeater domains. Generally, port indicators may be spatially arranged to provide a visual representation of the operation of the repeater.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
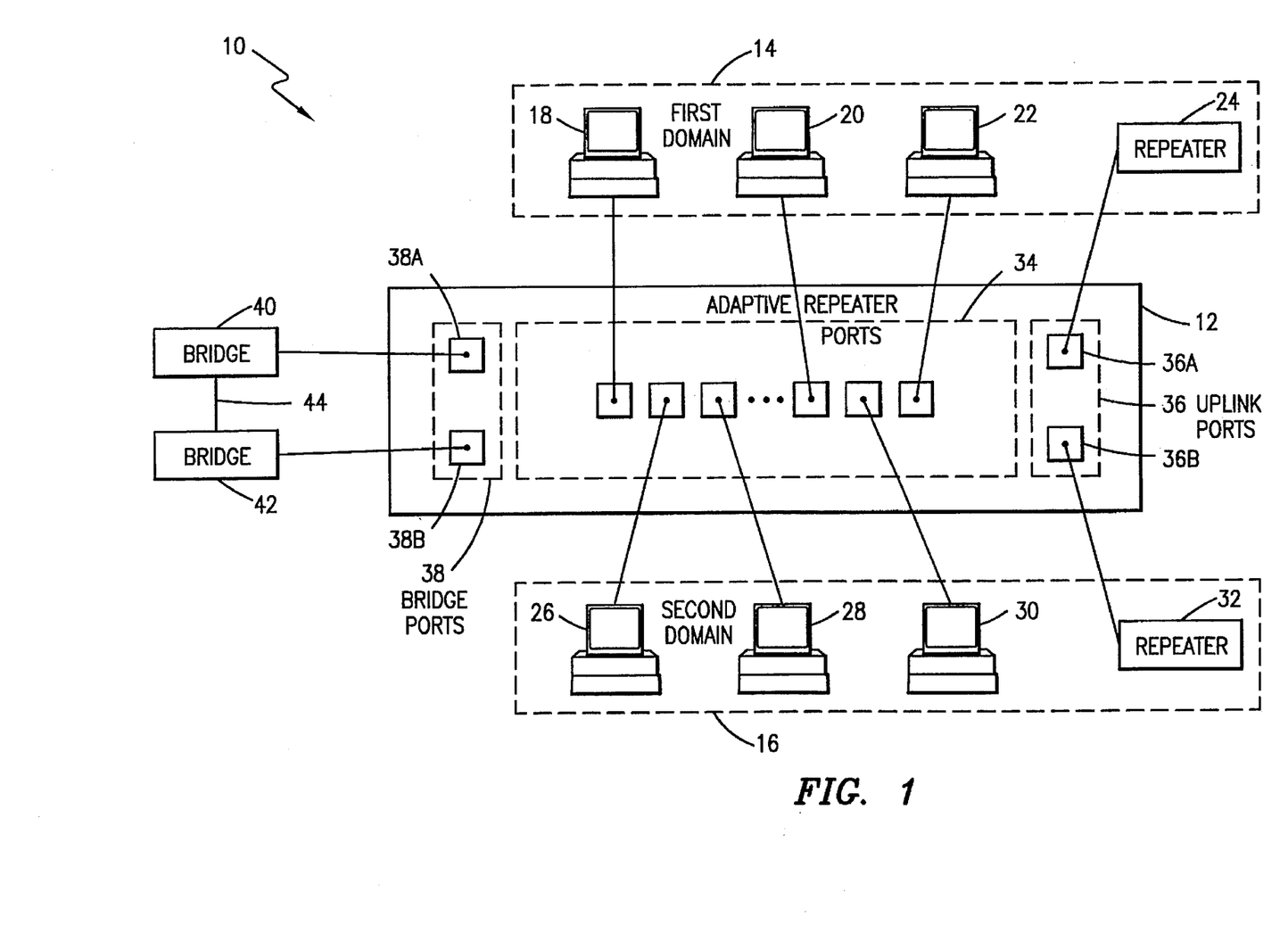
FIG. 1 illustrates a network of data devices.

FIG. 1 illustrates a network 10 for interconnecting a plurality of data devices. Network 10 includes a repeater 12 servicing data devices in a first domain 14 using a first communications protocol and data devices in a second domain 16 using a second communications protocol. In a particular embodiment, first domain 14 includes devices operating at 10-Mbps and second domain 16 includes devices operating at 100-Mbps. Repeater 12 may also serve more than two domains without departing from the scope of the present invention.

Network 10 can operate as an Ethernet local area network (LAN) (specified in IEEE 802.3), a fast Ethernet LAN (specified in IEEE 802.3u), or as any other network for communicating data among data devices coupled to repeater 12. Devices in network 10 may operate using 10Base-T, 100Base-TX, 100Base-T4, copper digital data interface (CDDI), asynchronous transfer mode (ATM), or any other suitable communications protocol. Generally, a communications protocol is any format, definition, or specification for the communication of data, whether implemented in software, hardware, or both. A protocol may include, without limitation, transmission rates, wireline or wireless link specifications, frame formats, blocking formats, text formats, stop/start indicators, framing and heading indicators, field definitions, checksum values, carriage return and line feed (CR/LF) indicators, and any other suitable information that specifies the content or nature of the transmitted data or the link over which the data is transmitted. Repeater domains 14 and 16 in network 10 are associated with different communications protocols.

First domain 14 includes data devices 18, 20, and 22. Second domain 16 includes data devices 26, 28, and 30. Data devices 18, 20, 22, 26, 28, and 30, represented collectively by exemplary data device 18, include any source or destination of data connected to network 10. Data device 18 is any type of data terminal equipment (DTE) that allows either input or output of data. Data device 18 may be a computer, work station, file server, modem, printer, or any other device that can receive or transmit data in network 10. For example, data devices 18, 20, and 22 may transmit and receive data at a first rate, such as 10-Mbps using traditional Ethernet protocol. Data devices 26, 28, and 30 may transmit and receive data at a second rate, such as 100-Mbps using fast Ethernet protocol. Data devices may be coupled to repeater 12 using unshielded twisted pair (UTP), shielded twisted pair (STP), fiber optic lines, wireless links, such as infrared or radio frequency links, or any other link that allows communication of data between data devices and repeater 12.

Repeaters 24 and 32 increase the number of data devices serviced in first domain 14 and second domain 16, respectively. Repeater 24 operates using the first communications protocol and allows additional data devices to be added to domain 14. Repeater 32 operates at using the second communications protocol and allows additional data devices to be added to second domain 16. Repeaters 24 and 32 may be coupled to repeater 12 using any of the technologies discussed above for coupling data devices, including a fiber optic inter-repeater link (FOIRL).

Data devices in first domain 14 and second domain 16 couple to ports 34 on repeater 12. Each port 34 operates at a selected communications protocol in response to link pulses or data received from the coupled data device. Ports 34 are protocol agile, that is, they automatically negotiate the protocol of coupled data devices and select the appropriate protocol to communicate data. A data device may modify its data rate and repeater 12 can automatically place the data device in the proper repeater domain without modifying couplings at ports 34. In a specific example, data device 18 may upgrade from a 10-Mbps to a 100-Mbps communications protocol, and the associated port 34 would automatically detect the change and place data device 18 in second domain 16. In this manner, a network that includes data devices that operate using different communications protocols can be easily managed, upgraded, and re-configured without the need to modify couplings at ports 34.

Optional uplink ports 36 couple repeaters 24 and 32 to first domain 14 and second domain 16, respectively. Uplink ports 36 may be switchable to service only a single communications protocol or may be protocol agile like ports 34. In the configuration of FIG. 1, uplink port 36a operates at a first communications protocol and couples to repeater 12 to increase the number of data devices in first domain 14. Furthermore, repeater 24 may include another uplink port to couple to another repeater for further increasing the number of data devices in first domain 14. In a similar fashion, uplink port 36b operates at a second communications protocol and couples to repeater 32 for increasing the number of data devices in second domain 16. Likewise, repeater 32 may include another uplink port to couple to an additional repeater for further increasing the number of data devices in second domain 16. Repeater-to-repeater couplings may be a daisy-chain connection or other appropriate coupling.

Optional bridge ports 38 couple devices in first domain 14 and devices in second domain 16 to bridge 40 and bridge 42, respectively. Repeater 10 may also perform this bridging function using ports 34. Bridge port 38a operates, at least in part, at a first communications protocol and couples devices in first domain 14 to bridge 40. Bridge port 38b operates, at least in part, at a second communications protocol and couples devices in second domain 16 to bridge 42. Bridges 40 and 42 are shown as separate components, but it should be understood that they may be combined into an integral bridge. Bridges 40 and 42 allow data to be communicated between first domain 14 and second domain 16, as represented by link 44.

In operation, repeater 12 of network 10 services data devices that operate using two or more communications protocols. For example, data device 18 communicates data to repeater 12. Repeater 12 detects a link pulse or data at a first communications protocol and establishes data communications with data device 18. Repeater 12 then re-transmits this data to other devices coupled to repeater 12 that are operating at the first communications protocol. Therefore, repeater 12 re-transmits the data to data devices 20 and 22, and optionally to repeater 24 and bridge 40. Similarly, data generated at data device 26 at a second communications protocol is re-transmitted by repeater 12 to data devices 28 and 30, and optionally to repeater 32 and bridge 42. Repeater 12 automatically detects the communications protocol at ports 34, and establishes first domain 14 and second domain 16 accordingly.

Data device 18 in first domain 14 can communicate data to data device 26 in second domain 16 using bridges 40 and 42. Data device 18 transmits data at a first communications protocol to repeater 12. Repeater 12 re-transmits the data received from data device 18 to other devices coupled to repeater 12 operating at the first communications protocol, including bridge 40. Bridge 40 operating, at least in part, at the first communications protocol re-transmits the data to bridge 42 using link 44. In bridge 40 or bridge 42, the data at the first communications protocol is converted into data at a second communications protocol, and bridge 42 re-transmits this data to port 38b of repeater 12. The data, now at the second communications protocol, is then re-transmitted to the devices coupled to repeater 12 operating at the second communications protocol, including data device 26.

Figure 2:
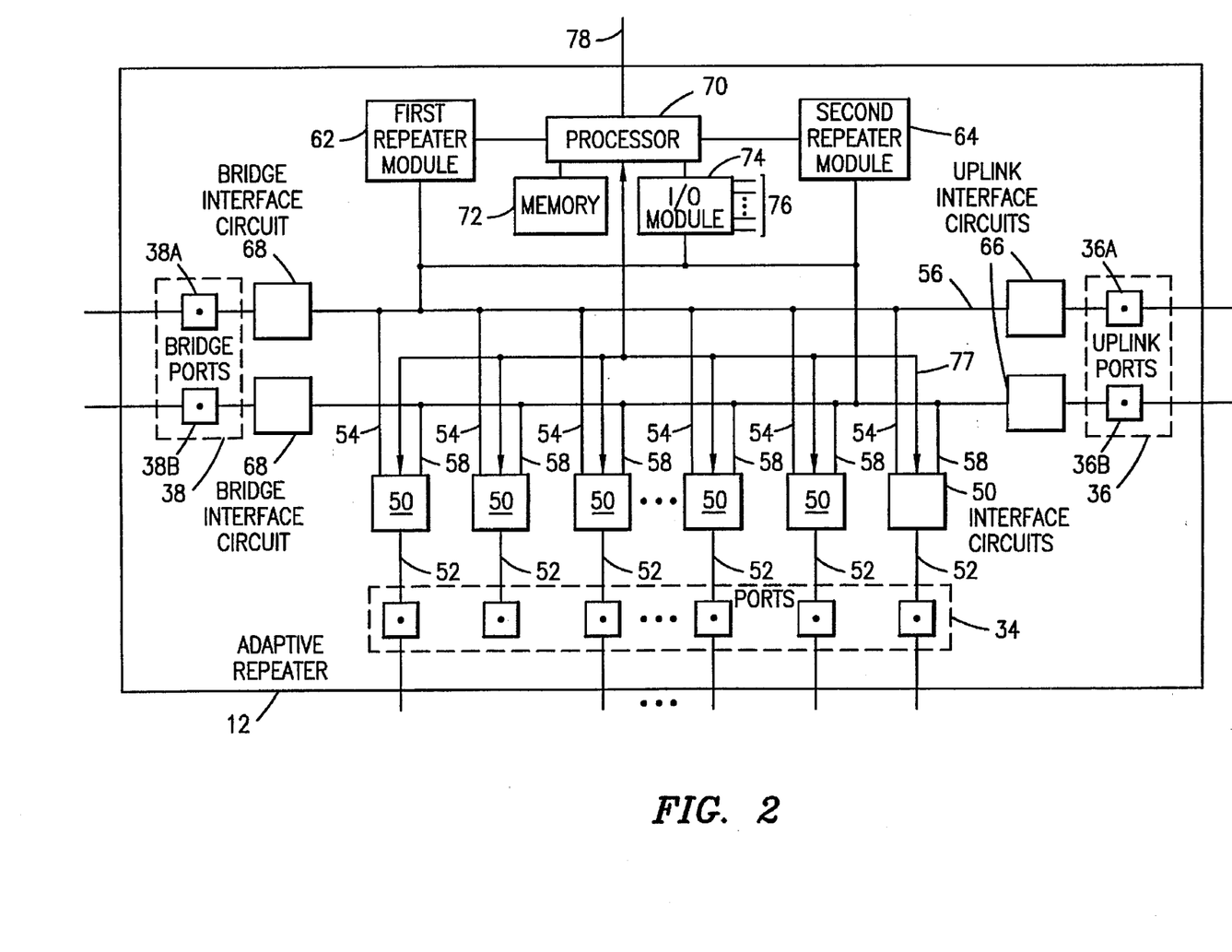
FIG. 2 is a schematic representation of a repeater.

FIG. 2 is a schematic representation of repeater 12 that includes ports 34, uplink ports 36, and bridge ports 38. Repeater 12 services data devices and repeaters in both first domain 14 and second domain 16. Repeater 12 also couples to bridges 40 and 42, which provide communication among first domain 14, second domain 16, and other repeater domains in network 10. Each port 34 couples a data device to an associated interface circuit 50.

Interface circuits 50 couple ports 34 to a first repeater module 62 and a second repeater module 64. Each interface circuit 50 includes a port link 52 coupled to port 34. A first bus link 54 couples interface circuit 50 to a first bus 56 supporting a first communications protocol. Interface circuit 50 also includes a second bus link 58 coupled to a second bus 60 supporting a second communications protocol. First repeater module 62 couples to first bus 56, and second repeater module 64 couples to second bus 60. First repeater module 62 and second repeater module 64 manage communications to and from interface circuits 50 over first bus 56 and second bus 60, respectively. Interface circuits 50 may be Ethernet transceivers or other physical layer components that can operate at different communications protocols, depending on the communications protocol used by the associated data device. For example, interface circuits 50 may support both 10-Mbps and 100-Mbps communications protocols. Examples of such commercially available devices include the RCC611 100BaseTX transceiver manufactured by Raytheon or the DP83840 10/100 Mbps physical layer device manufactured by National Semiconductor.

A processor 70 is coupled to first repeater module 62 and second repeater module 64. Processor 70 is also coupled to memory 72 and input/output module 74. In one embodiment, processor 70 is also coupled to interface circuits 50 using control bus 77. In general, processor 70 performs management, diagnostic, and display functions for repeater 12. Memory 72 may be RAM, ROM, or other memory device that can store information on the status and operation of repeater 12. Memory 72 may also store operational code for execution by processor 70 to direct, for example, the display functions of repeater 12. Input/output module 74 is coupled to first repeater module 62 and second repeater module 64. Input/output module 74 is also coupled to indicators and a mode switch of repeater 12 using links 76, as described below with reference to FIGS. 4–7. Processor 70, memory 72, and input/output module 74 may be separate components or integral to first repeater module 62 and second repeater module 64.

In operation, interface circuits 50 receive data at a first communications protocol or a second communications protocol, and communicate data received at the first communications protocol to first repeater module 62 and data received at the second communications protocol to second repeater module 64. After detecting the protocol of the received data, interface circuits 50 then select the appropriate data—either data at the first communications protocol on bus 56 or data at the second communications protocol on bus 60—for re-transmission to port 34 and the attached data device. Interface circuits 50 continue to receive and transmit data at the selected protocol until a different protocol is detected.

Control bus 77 allows interface circuits 50 and processor 70 to communicate information relating to the operation of repeater 12. For example, interface circuit 50 may communicate link or protocol detect information to processor 70 using control bus 77. In response, processor 70 may then use control bus 77 to convey control information requesting interface circuits 50 to configure the link with its associated device in accordance with the detected protocol. Interface circuits 50 may or may not require instructions from processor 70 before configuring the link.

First repeater module 62 receives data from a first interface circuit 50 operating at the first communications protocol and re-transmits the data to the remaining interface circuits 50 operating at the first communications protocol. Similarly, second repeater module 64 receives data from a second interface circuit 50 operating at the second communications protocol and re-transmits the data to the remaining interface circuits operating at the second communications protocol. First repeater module 62 and second repeater module 64 may also receive or generate port information and convey this port information to input/output module 74 for display.

Uplink interface circuits 66 couple uplink ports 36a and 36b to first bus 56 and second bus 60, respectively. Bridge interface circuits 68 couple bridge ports 38a and 38b to first bus 56 and second bus 60, respectively. In the embodiment of FIG. 2, uplink ports 36 and bridge ports 38 are not switchable. Therefore, uplink port 36a and bridge port 38a communicate with first repeater module 62, and uplink port 36b and bridge port 38b communicate with second repeater module 64. However, ports 34, uplink ports 36, and bridge ports 38 may or may not be switchable.

First bus 56 and second bus 60 are shown as separate components of repeater 12. However, bus 56 and bus 60 may be integral to first repeater module 62, second repeater module 64, interface circuits 50, uplink interface circuits 66, bridge interface circuits 68, or a combination of these components. The present invention contemplates any structure or operation of first bus 56 and second bus 60 that allows first repeater module 62 and second repeater module 64, respectively, to interconnect with interface circuits 50, uplink interface circuits 66, and bridge interface circuits 68.

Processor 70 executes instructions stored in memory 72 to perform its management, operational, and display functions. One function of processor 70 is to receive operational and status information from first repeater module 62 and second repeater module 64. This information may be stored in a portion of memory 72 and conveyed to indicators coupled to links 76 of input/output module 74.

Processor 70 also sends commands or information to first repeater module 62 and second repeater module 64. For example, processor 70 may command first repeater module 62 or second repeater module 64 to reset or deactivate a misbehaving or non-operational port 34. Furthermore, processor 70 conveys status or operational information to a data device coupled to repeater 12 using first repeater module 62 or second repeater module 64. In turn, processor 70 also receives commands and other information from a data device coupled to repeater 12. In such a manner, processor 70 provides management and control of repeater 12 using a remote data device coupled to one of ports 34 or using a local device coupled to link 78.

Figure 3:
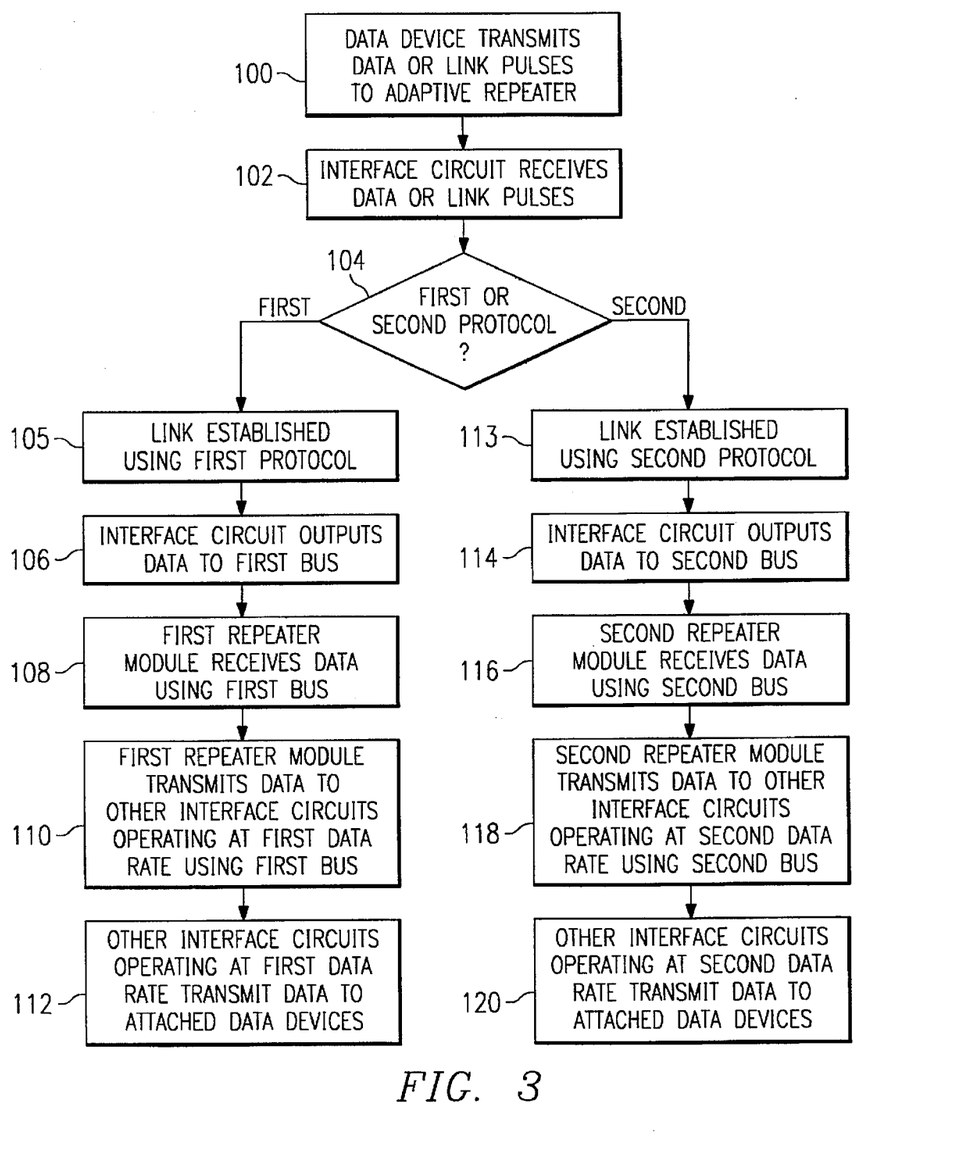
FIG. 3 is a flow chart of a method of communicating data using the repeater.

FIG. 3 illustrates a flow chart of a method for exchanging data among data devices coupled to repeater 12 in network 10. A data device 18 transmits data or link pulses to repeater 12 at step 100. Interface circuit 50 coupled to port 34 associated with data device 18 receives this data or link pulses on port link 52 at step 102. Interface circuit 50 performs an auto-negotiation or other technique on the received data or link pulses to determine the communications protocol of data device 18 at step 104. This may be performed using N-way auto-negotiation developed by International Business Machines, or any other technique to detect the communications protocol used by data device 18.

If data is received at a first communications protocol, then interface circuit 50 establishes a link with data device 18 using the first communications protocol at step 105. Interface circuit 50 communicates data received from data device 18 to first bus 56 using first bus link 54 at step 106. First repeater module 62 receives the data using first bus 56 at step 108. First repeater module 62 then transmits data using first bus 56 and first bus links 54 to other interface circuits 50 operating at the first communications protocol at step 110. The other interface circuits 50 operating at the first communications protocol transmit the data using port links 52 to associated data devices attached to ports 34 at step 112.

If interface circuit 50 determines that the data received at port link 52 is at a second communications protocol at step 104, then interface circuit 50 establishes a link with data device 18 using the second communications protocol at step 113. Interface circuit 50 communicates the data received from data device 18 to second bus link 58 coupled to second bus 60 at step 114. Second repeater module 64 receives the data using second bus 60 at step 116. Second repeater module 64 then transmits the data using second bus 60 and second bus links 58 to other interface circuits 50 operating at the second communications protocol at step 118. The other interface circuits 50 operating at the second communications protocol transmit the data using port links 52 to associated data devices attached to ports 34 at step 120.

First repeater module 62 and second repeater module 64 may also communicate with associated uplink interface circuits 66. Uplink interface circuits 66 communicate with repeaters 24 and 32 to increase the number of data devices in first domain 14 and second domain 16, respectively. First repeater module 62 and second repeater module 64 may also communicate with bridge interface circuits 68. Bridge interface circuits 68 communicate with bridges 40 and 42 using bridge ports 38.

Figure 4:
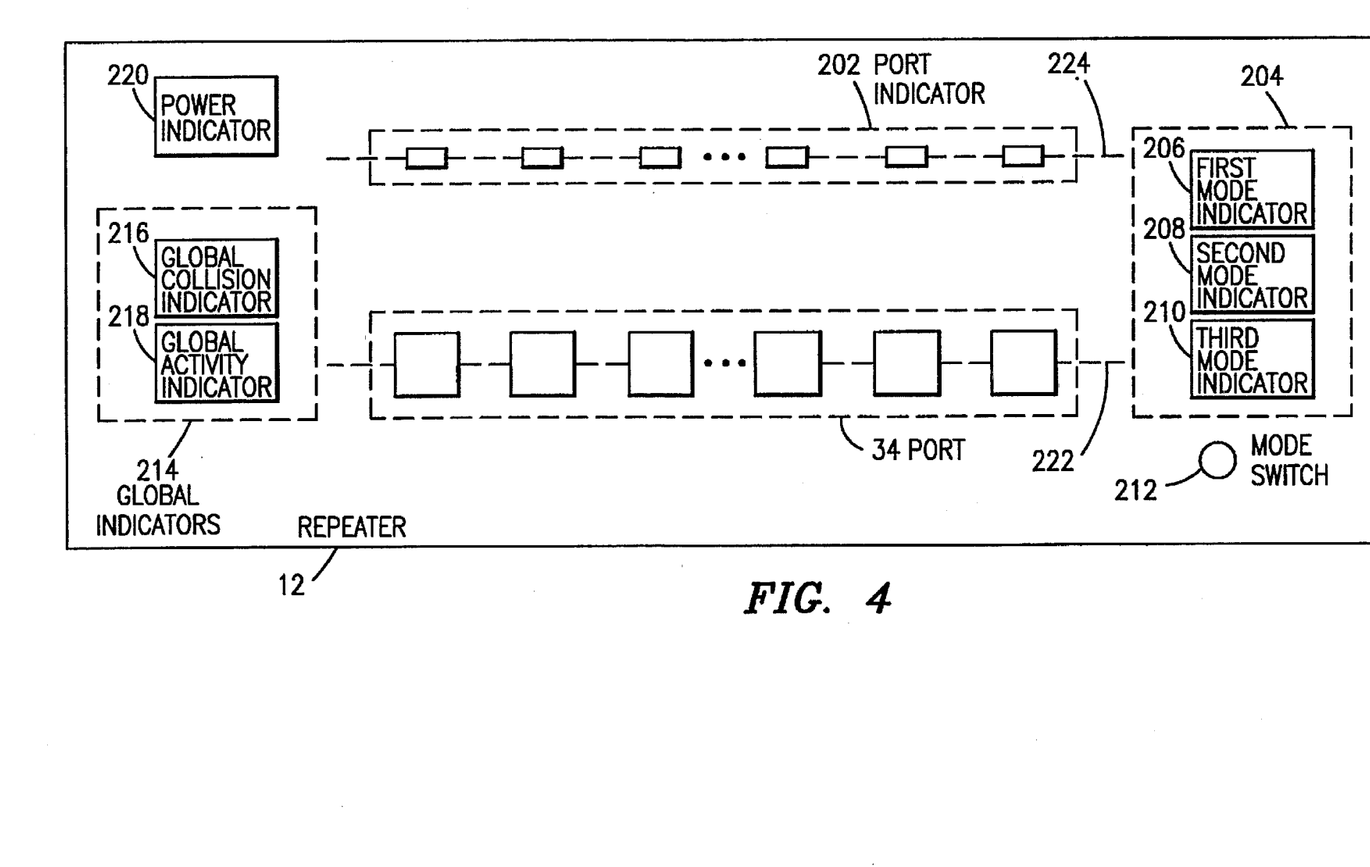
FIG. 4 illustrates the repeater having a display.

FIG. 4 illustrates repeater 12 having a display to convey information on the operation of network 10. In this embodiment, repeater 12 includes one port indicator 202 associated with each port 34. Port indicators 202 are coupled by links 76 to input/output module 74, as described above with reference to FIG. 2. Each port indicator 202 displays information on its associated port 34. Although FIGS. 4-7 illustrate the structure and operation of repeater 12 servicing two repeater domains, it should be understood that these concepts may be extended to more than two repeater domains without departing from the scope of the present invention.

Port indicator 202 conveys link information that signifies whether port 34 maintains a valid coupling to a corresponding data device. Activity information is also conveyed by port indicator 202 to reflect receive and transmit activity on port 34. Furthermore, port indicator 202 indicates whether its associated port 34 has been partitioned or disconnected from network 10 due to jabber, excessive collisions, or other malfunction that suggests port 34 should no longer communicate with its associated data device. Port indicator 202 may be a single, bi-color, or multi-color light emitting diode (LED), an incandescent bulb, a flip card, or other indicator that can convey information on port 34. Port indicator 202 may utilize colors, blinking, light intensity, or other visually distinguishable characteristic to convey information regarding port 34.

In one embodiment, port indicator 202 signifies a valid link with a corresponding device using a solid green light, with no light indicating no valid link. To represent activity information, port indicator 202 flashes in the same color that signifies a valid link. If the associated port 34 has been partitioned or deactivated, port indicator 202 indicates this partition status using a continuous color different from the color used for a valid link, such as yellow.

Since ports 34 are capable of coupling to data devices in both first domain 14 and second domain 16, there arises a need to convey information on ports 34 that may operate in more than one repeater domain. To accomplish this, repeater 12 includes a mode indicator 204 which indicates the repeater domain for which port indicators 202 are currently displaying information. In one embodiment, mode indicator 204 includes a first mode indicator 206, a second mode indicator 208, and a third mode indicator 210. Port indicators 202 display information on ports 34 operating in first domain 14 when first mode indicator 206 is activated. Port indicators 202 display information on ports 34 operating in second domain 16 when second mode indicator 208 is activated. When third mode indicator 210 is activated, port indicators 202 alternately display information on ports 34 operating in first domain 14 and ports 34 operating in second domain 16. Mode indicator 204 may include additional indicators for additional repeater domains serviced by repeater 12.

A mode switch 212 allows a user to select the following modes: continuous display of information on ports 34 in first domain 14, continuous display of information on ports 34 in second domain 16, and alternating display between information on ports 34 in first domain 14 and information on ports 34 in second domain 16. In one embodiment, mode switch 212 is a momentary switch that when depressed changes the mode as indicated by mode indicator 204.

Repeater 12 also includes global indicators 214 that convey information on first domain 14 or second domain 16. For example, a global collision indicator 216 may be activated when a collision is detected in a repeater domain. Similarly, a global activity indicator 218 may be activated, and optionally blinking, when transmit or receive activity is occurring in a repeater domain. In a similar fashion to port indicators 202, global indicators 214 display information on first domain 14 or second domain 16 in accordance with mode indicator 204. Therefore, if first mode indicator 206 is activated, global indicators 214 display information on first domain 14. Likewise, if second mode indicator 208 is activated, global indicators 214 display information on second domain 16. In addition, global indicators 214 may alternately display information on first domain 14 and second domain 16 when third mode indicator 210 is activated. Power to repeater 12 is signified by power indicator 220.

Ports 34 of repeater 12 are positioned along a single horizontal line 222. Port indicators 202 are also positioned along a single horizontal line 224 parallel to line 222. It should be understood that the present invention contemplates any spatial arrangement of ports 34 and port indicators 202 to present a visual association between each port indicator 202 and its associated port 34. For example, ports 34 and port indicators 202 may be positioned along several lines in any orientation.

Figure 5:
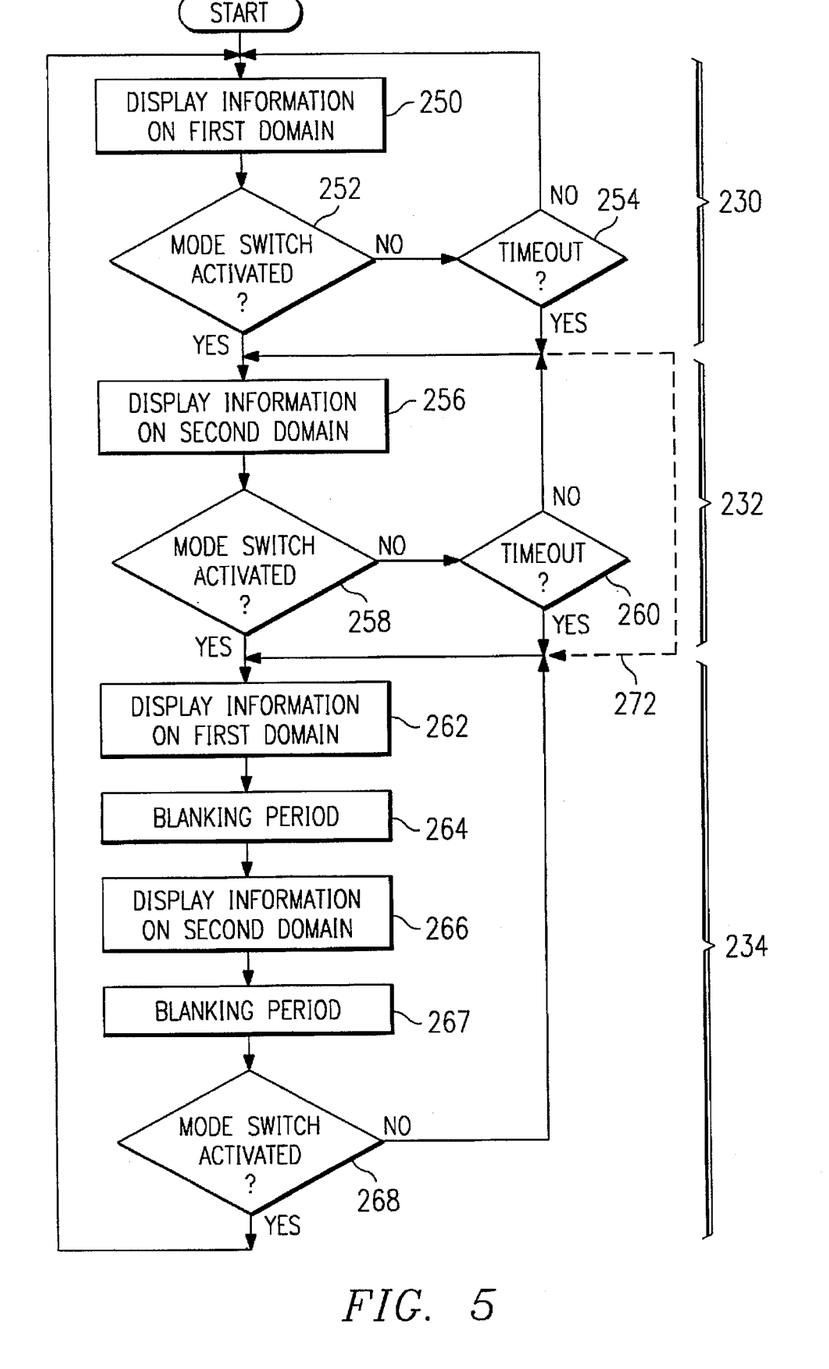
FIG. 5 is a flow chart of a method for displaying information of the repeater.

FIG. 5 illustrates a flow chart of a method for displaying information on repeater 12. The method includes sections for a first mode 230, a second mode 232, and an alternating mode 234. In one embodiment, the method for displaying information is directed by processor 70 executing instructions stored in memory 72. Alternatively, the method for displaying information may be directed by first repeater module 62 and second repeater module 64.

Repeater 12 begins in first mode 230 and displays information on first domain 14 at step 250. This is accomplished by illuminating first mode indicator 206 while both displaying information on ports 34 operating in first domain 14 using port indicators 202 and displaying information on first domain 14 using global indicators 214. The method then checks if mode switch 212 has been activated at step 252. If mode switch 212 has not been activated and a time-out has not occurred at step 254, then repeater 12 continues to display information on first domain 14.

If mode switch 212 has been activated at step 252 or a time-out has occurred at step 254, then repeater 12 transitions to second mode 232 and displays information on second domain 16 at step 256. The method then checks if mode switch 212 has been activated at step 258. If mode switch 212 has not been activated and a time-out has not occurred at step 260, then repeater 12 continues to display information on second domain 16.

If mode switch 212 has been activated at step 258 or a time-out has occurred at step 260, then repeater 12 transitions to alternating mode 234 and initially displays information on first domain 14 at step 262. After a predetermined amount of time, repeater 12 stops displaying information on first domain 14 and enters a blanking period at step 264 before displaying information on second domain 16 at step 266. The blanking period at step 264 ensures that an observer does not confuse which repeater domain information is currently being displayed.

After displaying information on second domain 16 for a predetermined amount of time at step 266, repeater 12 enters another blanking period 267. Mode switch 212 is again checked for activation by the user at step 268. If mode switch 212 has not been activated, then repeater 12 continues in alternating mode 234 at steps 262–267. If mode switch 212 has been activated at step 268, then repeater 12 transitions to first mode 230 at step 250.

Time-outs at steps 254 and 260 may be re-arranged so that a time-out from any mode may result in resetting to any other mode. For example, a time-out at step 254 may trigger operation in second mode 232 or, as shown by alternative path 272, operation in alternating mode 234. By removing, adding, or modifying time-outs, the flow control can be manipulated to produce any sequencing of the three modes.

Figure 6:
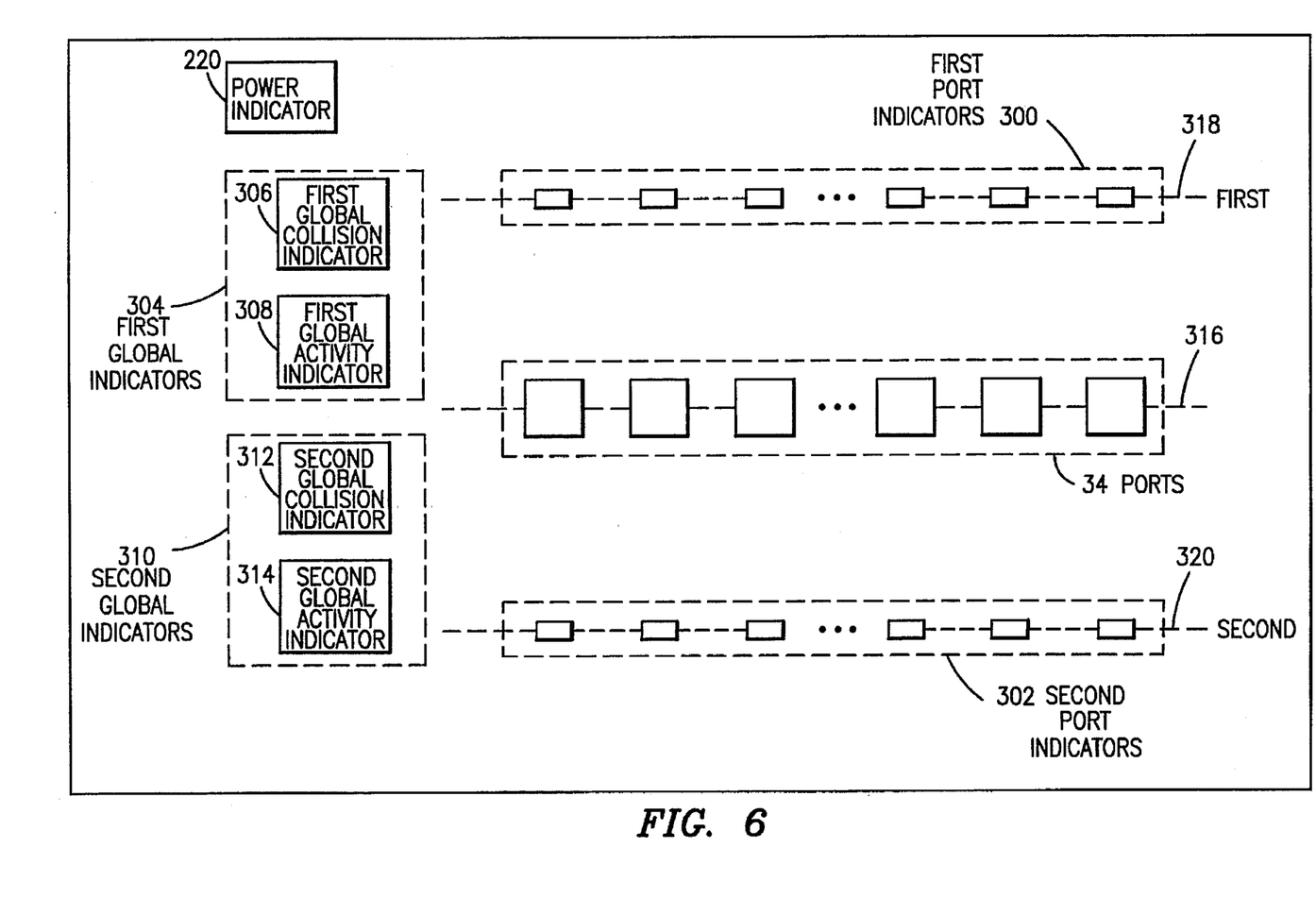
FIG. 6 illustrates an alternative embodiment of the repeater having a display.

FIG. 6 illustrates an alternative embodiment of repeater 12 having a display. First port indicators 300 and second port indicators 302 display information on ports 34. This information may be any of the types of information displayed by port indicators 202, described above with reference to FIG. 4. Each port 34 is associated with a first port indicator 300 for displaying information on port 34 operating in first domain 14 and a second port indicator 302 for displaying information on port 34 operating in second domain 16.

First global indicators 304 display information on first domain 14. For example, first global collision indicator 306 may be activated when a collision is detected in first domain 14. Similarly, first global activity indicator 308 may be activated, and optionally blinking, when receive or transmit activity is detected in first domain 14. Likewise, second global indicators 310 display information on second domain 16. For example, second global collision indicator 312 may be activated when a collision is detected in second domain 16. Second global activity indicator 314 may be activated, and optionally blinking, when receive or transmit activity is detected in second domain 16.

Ports 34, first port indicators 300, and second port indicators 302 may be spatially arranged in any fashion to indicate association between port 34 and its associated first port indicator 300 and second port indicator 302. In FIG. 6, ports 34 are positioned along a single horizontal line 316. Likewise, first port indicators 300 and second port indicators 302 are positioned along horizontal lines 318 and 320, respectively. By disposing ports 34 between first port indicators 300 and second port indicators 302, repeater 12 allows an observer to quickly and accurately assess the operation of ports 34 in first domain 14 and second domain 16. Global indicators 304 and 310 spatially correspond to first port indicators 300 and second port indicators 302, respectively.

Figure 7:
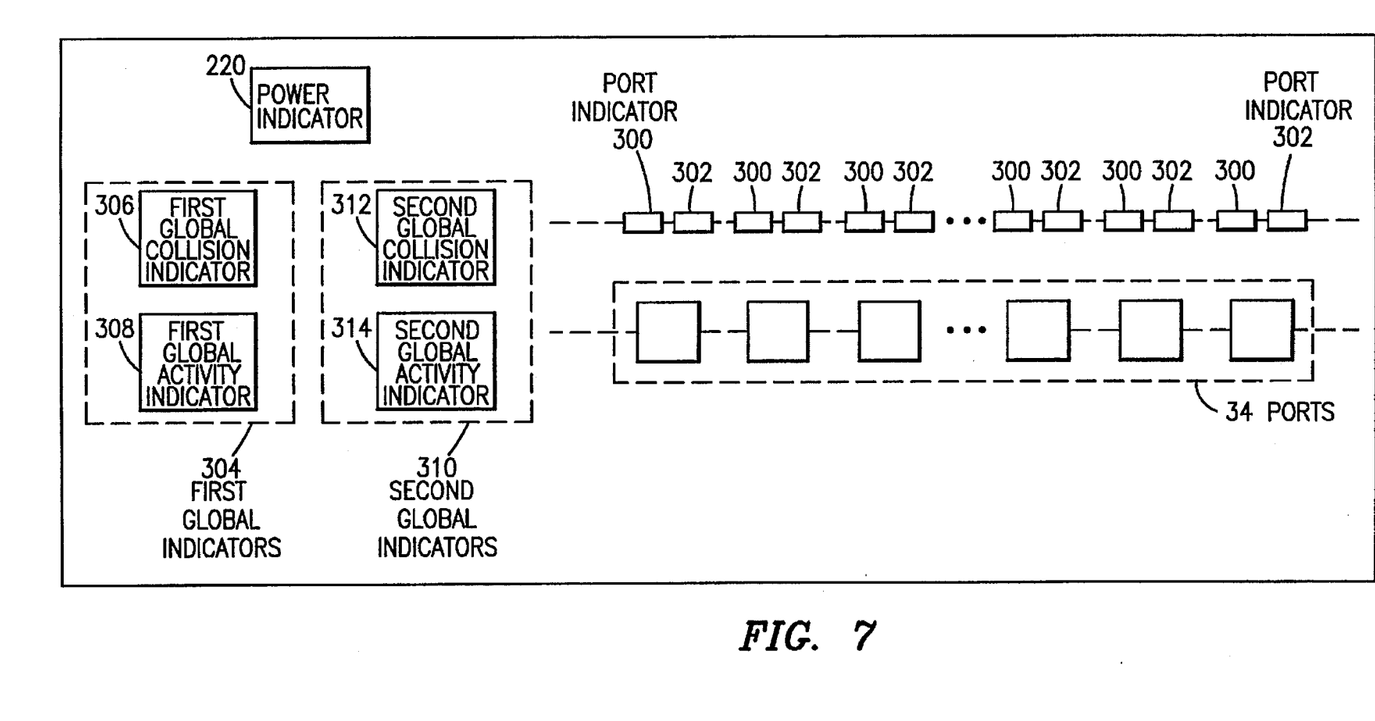
FIG. 7 illustrates another alternative embodiment of the repeater having a display.

FIG. 7 illustrates another alternative embodiment of repeater 12 having a display. Due to cost, design, cabling, or other considerations, port indicators 300 and 302 may be placed above ports 34. In this embodiment, first port indicator 300 is disposed on the left side and second port indicator 302 is disposed on the right side above its corresponding port 34. Likewise, first global indicators 304 for first domain 14 and second global indicators 310 for second domain 16 are also arranged in a similar side-by-side manner.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A repeater for exchanging data among a plurality of data devices, comprising:
   a plurality of ports positioned along a first line and operable to couple to the data devices, each port operable to exchange data with an associated data device in a selected one of a first associated data device in a selected one of a first domain and a second domain;
   a plurality of port indicators positioned along a second line parallel to the first line, each port indicator associated with one of the ports, each port indicator operable to display information on its associated port; and
   a mode indicator having a first mode and a second mode, the first mode signifying that the port indicators display information on ports operating in the first domain, the second mode indicating that the port indicators display information on ports operating in the second domain.

2. The repeater of claim 1, wherein:
   the first domain comprises data devices operating at a first data rate; and
   the second domain comprises data devices operating at a second data rate.

3. The repeater of claim 1, wherein the mode indicator comprises:
   a first mode indicator operable to indicate the first mode; and
   a second mode indicator operable to indicate the second mode.

4. The repeater of claim 1, wherein the mode indicator comprises:
   a first mode indicator operable to indicate the first mode;
   a second mode indicator operable to indicate the second mode; and
   a third mode indicator operable to indicate alternating over time between the first mode and the second mode.

5. The repeater of claim 1, comprising a mode switch operable to lock on one of a selected first mode and second mode.

6. The repeater of claim 1, wherein the information comprises activity information.

7. The repeater of claim 1, wherein the information comprises link information.

8. A method for displaying information on a plurality of ports of a repeater, the ports being positioned along a first line, each port operable to exchange data with an associated data device in a selected one of a first domain and a second domain, the method comprising:
   disposing a plurality of port indicators on the repeater, the port indicators positioned in a second line parallel to the first line, each port indicator associated with one of the ports;
   selecting one of a first mode and a second mode, the first mode signifying that the port indicators display information on ports operating in the first domain, the second mode signifying that the port indicators display information on ports operating in the second domain; and
   displaying information in response to the selected mode.

9. The method of claim 8, wherein the step of disposing comprises positioning the port indicators along a line.

10. The method of claim 8, wherein the step of selecting comprises automatically alternating over time between the first mode and the second mode.

11. The method of claim 8, wherein the step of selecting comprises activating a mode switch to lock on one of a selected first mode and second mode.

12. The method of claim 8, wherein the information comprises activity information.

13. The method of claim 8, wherein the information comprises link information.

14. A repeater for exchanging data among a plurality of data devices, comprising:

a plurality of ports positioned along a first line and operable to couple to the data devices, each port operable to exchange data with an associated data device in a selected one of a first domain and a second domain;

a plurality of first port indicators positioned along a second line parallel to the first line, each first port indicator associated with one of the ports, each first port indicator operable to display information when its associated port operates in the first domain; and a plurality of second port indicators positioned along a third line parallel to the first line, each second port indicator associated with one of the ports, each second port indicator operable to display information when its associated port operates in the second domain.

15. The repeater of claim 14, wherein:

the first domain comprises data devices operating at a first data rate; and the second domain comprises data devices operating at a second data rate.

16. The repeater of claim 14, wherein the information comprises activity information.

17. The repeater of claim 14, wherein the information comprises link information.

18. The repeater of claim 14, wherein:

the first line is disposed between the second line and the third line.

19. A system for exchanging data among a plurality of data devices, comprising:

a first domain having data devices operating at a first communications protocol;

a second domain having data devices operating at a second communications protocol;

a plurality of ports positioned along a first line and operable to couple to the data devices, each port operable to exchange data with an associated data device in a selected one of the first domain and the second domain; and a plurality of port indicators positioned along a second line parallel to the first line, each port indicator associated with one of the ports, each port indicator operable to display information on its associated port.

20. The system of claim 19, comprising a mode indicator having a first mode and a second mode, the first mode signifying that the port indicators display information on ports operating in the first domain, the second mode indicating that the port indicators display information on ports operating in the second domain.

21. The system of claim 19, wherein the port indicators comprise:

a plurality of first port indicators, each first port indicator associated with one of the ports, each first port indicator operable to display information on its associated port operating in the first domain; and a plurality of second port indicators, each second port indicator associated with one of the ports, each second port indicator operable to display information on its associated port operating in the second domain.

22. The system of claim 19, wherein the information comprises activity information.

23. The system of claim 19, wherein the information comprises link information.

24. A repeater for exchanging data among a plurality of data devices, comprising:

a plurality of ports positioned along a first line and operable to couple to the data devices, each port operable to exchange data with an associated data device in a selected one of a first domain and a second domain;

a plurality of first port indicators positioned along a second line parallel to the first line, each first port indicator associated with one of the ports, each first port indicator operable to display information when its associated port operates in the first domain; and a plurality of second port indicators, each second port indicator associated with one of the ports, each second port indicator operable to display information when its associated port operates in the second domain.

25. The repeater of claim 24, wherein:

the first domain includes data devices operating at a first data rate; and the second domain comprises data devices operating at a second data rate.

* * * * *